Aug. 26, 1930.  V. GLADKOV  1,773,994
APPARATUS FOR THE MANUFACTURE OF SPIRAL PIPE
Filed Nov. 21, 1928
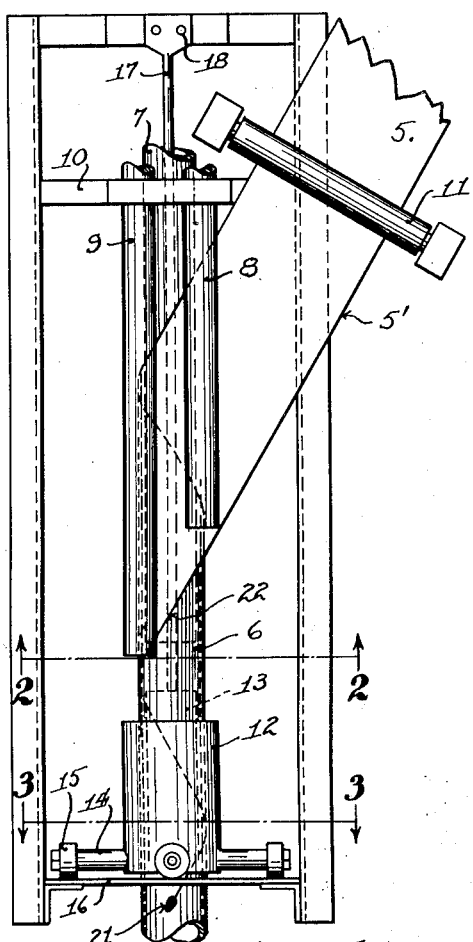
INVENTOR.
Vladimir Gladkov
BY Booth & Booth
ATTORNEYS.

Patented Aug. 26, 1930

1,773,994

UNITED STATES PATENT OFFICE

VLADIMIR GLADKOV, OF BERKELEY, CALIFORNIA, ASSIGNOR TO CALIFORNIA CORRUGATED CULVERT CO., OF BERKELEY, CALIFORNIA, A CORPORATION OF CALIFORNIA

APPARATUS FOR THE MANUFACTURE OF SPIRAL PIPE

Application filed November 21, 1928. Serial No. 320,833.

My invention relates to the manufacture of spiral metallic pipe, and has particular, although not exclusive, reference to such pipe in which the spiral or helical seam is welded continuously as the pipe is formed.

The principal object of the invention is to provide an apparatus for the complete bending or forming of a sheet into a tube before the meeting edges are joined to make a helical seam. This is of particular importance when the seam is made by welding, because in order to produce a perfect weld, especially by a continuous process such as gas or electric fusion welding, it is essential that the meeting edges be perfectly matched and under the same condition of strain.

I achieve this object broadly by providing means for bending or winding the sheet helically into tubular form and guiding it in such form to a point remote from the bending means, and then carrying on the welding process as the formed tube leaves the guiding means.

In my apparatus, the tube is completely formed before the welding takes place; the meeting edges lie together perfectly, having the same curvature and being subject to equal strains.

By this means, I obviate certain disadvantages which accrue when the edges of the winding sheet are welded at the point at which they first meet, because at this point one edge is completely formed to the curvature of the tube while the other edge is in process of being bent, and is passing from a tangent to the curved form.

By performing the welding operation at a point remote from the final bending of the sheet, I am also able to pre-heat the two edges equally, either by a proper control of the welding flame or otherwise, and this assists in the production of a perfect weld.

In my apparatus, moreover, the unavoidable differences which occur in the characteristics of the metal of different sheets have less effect on the character of the weld than they would if the bending and welding operations were performed at approximately the same point.

A further object of the invention is to keep the heat of the welding flame away from the bending mechanism. A still further and a very important object is to permit the welding operation to be carried on at the greatest possible speed. This, of course, is a direct result of the conditions which lead to the formation of a perfect weld.

It is to be understood that my invention is not limited to the formation of welded pipe, because the advantages of guiding the formed tube to a point remote from the bending means before joining the meeting edges to form a seam would be present to some degree no matter what process be used for joining said edges.

It is also to be understood that the form, construction and arrangement of the several parts of the apparatus herewith illustrated and described may be varied within the limits of the claims hereto appended without departing form the spirit of the invention.

My invention will now be described in detail with reference to the accompanying drawings which show more or less diagrammatically the essential parts of an apparatus for carrying out the said invention, and in which—

Figure 1 is a plan view.

Figures 2 and 3 are sections taken respectively on lines 2—2 and 3—3 of Figure 1.

Figure 4 is a vertical longitudinal section through the center of the pipe.

In the drawings, the reference numeral 5 designates a strip or sheet of metal which is wound helically to form a tube 6. The character of the winding means is immaterial, but I prefer to employ three parallel rollers 7, 8 and 9, the former lying within the tube and the latter two bearing against the outer surface of the sheet. These bending rollers are assumed to be provided with suitable bearings which may be understood to be represented by the member 10.

The sheet 5 is properly guided at the desired angle to the axis of the tube 6 by any suitable means, not shown, and is preferably provided with a pair of feed rollers 11.

It is to be understood that the sheet is fed into and through the bending rollers 7, 8 and 9 either by the feed rollers 11 or by positively rotating said bending rollers, or by any other suitable means, not shown.

Various mechanism for driving the rollers 7, 8, 9 and 11 being commonly known in the art, it has been thought superfluous to show such mechanism.

The formed tube slips off the roller 7 endwise and passes through a floating guide mechanism, preferably comprising an outer sleeve 12 and an inner cylindrical shoe 13. The sleeve 12 is formed to rotate freely with the tube 6, but is prevented from moving endwise by laterally projecting arms 14 which have rollers 15 bearing against and travelling upon a vertical transverse plate 16, carried by the frame of the machine. The inner shoe 13 is prevented from moving endwise with the tube 6 by a rod 17 which extends through the bending roll 7 and is anchored at its rear end to the frame of the machine at 18. The shoe 13 is freely rotatable upon said rod 17 and is retained endwise thereon by a suitable thrust bearing, indicated by the nut 19 in Fig. 4.

The clearance between the tube 6 and the sleeve 12 and the shoe 13, which is shown exaggerated in Figs. 3 and 4, is sufficient to allow said tube to slide freely between said sleeve and said shoe, but the tube is held sufficiently close to prevent any distortion and to cause it to retain its true tubular form with the edges of its helically wound sheet meeting closely and accurately. The tube, therefore, issues from the sleeve 12 in perfectly formed condition.

The meeting edges of the wound sheet are joined preferably, although not necessarily, by a continuous welding process, performed as close to the end of the guide sleeve 12 as possible. I have shown in Fig. 4, a weld rod or electrode 20 as an example of a suitable welding means, it being understood that an electric arc is passed from said electrode to the tube 6 at the welding point 21, in a manner well known in the welding art. Whatever joining process is used, however, is preferably carried on at said point 21. If such joining be done by a welding process which requires that the inner surface of the tube be supported, the shoe 13 may be shifted outwardly, as indicated by the dotted line at 13' in Fig. 4, to provide such support. Otherwise, it is preferable to position the shoe 13 approximately in line with the end of the sleeve 12 as shown in full lines.

It is apparent that the initial feeding position of the sheet 5 is immaterial; it may be fed in vertically or in any other plane, and may be bent upwardly instead of downwardly, as shown; it being necessary only to arrange the bending and feed rollers 7, 8, 9 and 11 in the proper relative position. The angle of feed of the sheet with respect to the axis of the formed tube of course depends upon the width of said sheet and the diameter of said tube. The length of the guide means 12 and 13 is also immaterial. They may be positioned as close to the ends of the bending rolls as the edge of the incoming sheet 5 will permit, and they may be extended to any length suitable to insure that the tube will issue from them in perfectly formed stable condition.

In the drawings I have shown the tube as making one complete revolution between the final bending of the sheet which occurs at the point 22 in Fig. 1 and the welding point 21.

It will readily be seen from the foregoing description that the welding is carried on at a point remote from the bending of the sheet and that at the welding point the meeting edges of the wound sheet both lie in the same curve and are under the same strains. Therefore, welding, if done at the point 21, can be carried on with greater speed and perfection than would be possible at such a point as 22, where the forward edge 5' of the sheet is still in process of being bent.

It is to be noted that, because the guide sleeve 12 and shoe 13 are free to rotate with the tube, there is comparatively little friction produced. Such friction as exists is caused only by the endwise slip of the tube through said guide means, and is not sufficient to produce buckling of the sheet as it leaves the bending rolls. The wound sheet is therefore retained by said guide means in true tubular form, with its adjacent edges meeting closely and accurately until the joining or welding of said edges is performed.

I claim:—

1. An apparatus for making spiral pipe comprising means for winding a sheet helically into tubular form and advancing the wound sheet by a helical motion about its axis; guide means rotatable with the wound sheet for holding it in tubular form; and means for joining the adjacent edges of the guided wound sheet.

2. An apparatus for making spiral pipe comprising means for winding a sheet helically into tubular form and advancing the wound sheet by a helical motion about its axis; guide means rotatable with the wound sheet for holding it in tubular form; means for holding said guide means against endwise movement with the wound sheet; and means for joining the adjacent edges of the wound sheet after leaving said guide means.

3. An apparatus for making spiral pipe comprising means for winding a sheet helically into tubular form and advancing the wound sheet by a helical motion about its axis; a guide sleeve surrounding the wound sheet; means for holding said sleeve against endwise movement while permitting it to rotate with the wound sheet; and means for joining the adjacent edges of the wound sheet upon leaving said sleeve.

4. An apparatus for making spiral pipe comprising means for winding a sheet helically into tubular form and advancing the wound sheet by a helical motion about its axis; a guide sleeve surrounding the wound sheet; a guide shoe within the wound sheet; means for holding said sleeve and said shoe against endwise movement while permitting them to rotate with the wound sheet; and means for joining the adjacent edges of the wound sheet upon leaving the guide means.

5. An apparatus for making spiral pipe comprising a plurality of parallel rollers for winding a sheet helically into tubular form, the axis of the formed tube being parallel to the axes of said rollers, and said tube sliding off said rollers with a helical endwise motion; means for joining the meeting edges of the formed tube at a point remote from said rollers; and means for guiding the wound sheet to retain its tubular form from said rollers to said joining means.

6. An apparatus for making spiral pipe comprising means for winding a sheet helically into tubular form and advancing the wound sheet by a helical motion about its axis; a floating guide member surrounding and carried by the wound sheet and adapted to retain it in tubular form; and means for joining the edges of the guided wound sheet.

In testimony whereof I have signed my name to this specification.

VLADIMIR GLADKOV.